(12) United States Patent
Middendorf

(10) Patent No.: US 11,585,488 B2
(45) Date of Patent: Feb. 21, 2023

(54) FIBER-REINFORCED PRESSURE VESSEL

(71) Applicant: NPROXX B.V., Heerlen (NL)

(72) Inventor: Christian Middendorf, Aachen (DE)

(73) Assignee: NPROXX B.V., Rk Heerlen (DE)

( * ) Notice: Subject to any disclaimer, the term of this patent is extended or adjusted under 35 U.S.C. 154(b) by 518 days.

(21) Appl. No.: 16/633,798

(22) PCT Filed: Jul. 24, 2018

(86) PCT No.: PCT/EP2018/069980
§ 371 (c)(1),
(2) Date: Jan. 24, 2020

(87) PCT Pub. No.: WO2019/020597
PCT Pub. Date: Jan. 31, 2019

(65) Prior Publication Data
US 2021/0088183 A1 Mar. 25, 2021

(30) Foreign Application Priority Data

Jul. 26, 2017 (EP) .................................... 17183176

(51) Int. Cl.
*F17C 1/06* (2006.01)
*F17C 13/00* (2006.01)

(52) U.S. Cl.
CPC .............. *F17C 1/06* (2013.01); *F17C 13/002* (2013.01); *F17C 2201/0109* (2013.01); *F17C 2203/0604* (2013.01); *F17C 2203/0665* (2013.01); *F17C 2209/2154* (2013.01); *F17C 2209/234* (2013.01)

(58) Field of Classification Search
CPC .. F17C 1/06; F17C 13/002; F17C 2201/0109; F17C 2203/0665; F17C 2209/2154; F17C 2203/0668; F17C 2203/067; F17C 2203/0663
See application file for complete search history.

(56) References Cited

U.S. PATENT DOCUMENTS

| | | | | |
|---|---|---|---|---|
| 2,109,529 A | * | 3/1938 | Goddard | F17C 1/06 |
| | | | | 244/125 |
| 3,047,191 A | * | 7/1962 | Young | B64D 37/06 |
| | | | | 156/169 |
| 3,282,757 A | * | 11/1966 | Brussee | B29C 70/086 |
| | | | | 156/172 |
| 3,486,655 A | * | 12/1969 | Ragettli | B29C 53/605 |
| | | | | 156/175 |
| 11,092,287 B2 | * | 8/2021 | Kamiya | F16J 12/00 |

(Continued)

*Primary Examiner* — Don M Anderson
(74) *Attorney, Agent, or Firm* — Tarolli, Sundheim, Covell & Tummino LLP

(57) ABSTRACT

A pressure vessel is disclosed comprising an inner vessel with a rotationally symmetrical middle part with an axis of symmetry along the middle part and two dome-shaped polar caps which close off the middle part, and an outer layer, wound on the inner vessel to reinforce it, made of fiber composite material made of a plurality of plies of fibers embedded in a matrix material which are arranged one above another, which run as a fiber band made of a number of fibers with a location-dependent and position-dependent fiber orientation across the inner vessel, wherein the fiber band at least in some of the plies enters from the middle part at a respective entry fiber angle relative to the axis of symmetry into the region of the dome-shaped polar caps.

14 Claims, 3 Drawing Sheets

(56) References Cited

U.S. PATENT DOCUMENTS

| | | | |
|---|---|---|---|
| 2006/0049195 A1* | 3/2006 | Koussios | B29C 70/222 220/581 |
| 2009/0095796 A1* | 4/2009 | Prakash | F17C 1/06 228/184 |
| 2009/0314785 A1* | 12/2009 | Cronin | B29C 53/602 156/305 |
| 2018/0347759 A1* | 12/2018 | Huang | A61M 16/16 |
| 2018/0356041 A1* | 12/2018 | Despres | F17C 11/00 |
| 2020/0240586 A1* | 7/2020 | Sonnen | F17C 1/16 |
| 2021/0088183 A1* | 3/2021 | Middendorf | F17C 13/002 |
| 2021/0324999 A1* | 10/2021 | Bäumer | F17C 1/06 |

\* cited by examiner

FIBER-REINFORCED PRESSURE VESSEL

TECHNICAL FIELD OF THE INVENTION

The invention relates to a fiber-reinforced pressure vessel manufactured by means of fiber bands and to a method for producing the fiber-reinforced pressure vessel.

PRIOR ART

The market for pressure vessels which are reinforced with fiber composite material is continuously growing. Fiber-reinforced pressure vessels combine low weight with great mechanical strength. The increasing conveyance of natural gas and fracking gas, especially in countries without an appropriate pipeline network, is for example creating a demand for such pressure vessels, here in the form of pressure vessels for storing gas. Added to this there is the automotive sector, which is working hard on developing fuel-cell vehicles, in which the fuel is to be stored in the form of gaseous hydrogen at high pressure in pressure vessels. Lightweight pressure vessels are desired for transporting the pressure vessels, because transporting pressure vessels of high weights consumes an unnecessarily large amount of energy and therefore causes excessively high transportation costs.

Pressure vessels for storing gas which are currently used have a cylindrical middle part, on either side of which polar caps for closing the middle part are located. The reinforcing layer made of fiber composite material is wound as an outer layer of the pressure vessel, for example by means of a winding method, onto an inner vessel (in the case of pressure vessels what is called the liner), which acts as a winding core. A winding method is the preferred process for time-effective and cost-effective production of fiber composite layers. While the inner vessel for example guarantees tightness of the pressure vessel, the reinforcing layer made of fiber composite material gives the pressure vessel the necessary mechanical stability. For example, in the case of type 3 pressure vessels a metallic inner vessel (metallic liner) for example made of aluminum or steel is used; in the case of type 4 pressure vessels the inner vessel (liner) is produced from a plastics material. With type 3 pressure vessels, the liner bears mechanical loads to a notable extent, whereas with type 4 pressure vessels the liner does not contribute to bearing the load. Type 4 pressure vessels as a rule have on both sides what are called metallic boss parts, for example made of aluminum or steel, for accommodating e.g. valves or other connection parts, which are attached centrally to the longitudinal axis of the tank and comprise a portion of the polar-cap region.

The reinforcing layer of a pressure vessel has to be able to absorb axial and radial stresses; this is done by laying continuous filaments (in the form of what are called roving bands) in layers, the orientation and wall thickness of which correspond to the respective stress distributions; in the cylindrical region, the radial stresses can be absorbed substantially for example by the winding in the peripheral direction, i.e. a continuous filament (what is called a roving band) [is] laid on the liner at an angle of approx. 80° to 90° to the cylinder axis, whereas the axial stresses are absorbed substantially by helical windings, i.e. windings which run over the entire length of the vessel and are at angles of between 10° and 80° to the vessel axis. What are called flat helical plies at an angle of between approximately 10° and approximately 25° to the longitudinal axis of the vessel can be distinguished here from what are called steep helical plies with winding angles of approximately 25° to approximately 80°, preferably of approximately 40° to approximately 75°, to the longitudinal axis of the vessel. The flat helical plies in this case completely surround the boss parts, whereas the steep helical plies first and foremost cover the polar-cap region between the boss part and the cylindrical middle piece of the vessel.

Fibers on the curved surface of the polar caps are only fixed when they run along a geodesic path. The geodesic path in this case refers to a course between two points which represents a minimum distance. A fiber which is laid on a geodesic path would have to stretch in order to be able to slip out of its position. Therefore geodesically wound fibers are laid in a slip-resistant manner. In order to speed up the winding process, fiber bands made of a plurality of fibers are used. These strips therefore have a width which is for example between 5% and 15%, preferably 9% to 11%, of the diameter of the cylindrical middle part. When winding polar caps with fiber bands, however, most fibers, for example all the fibers apart from the central one, owing to the deflection which the fiber band undergoes at the polar caps, deviate from the geodesic path, so that most fibers of the fiber bands can slip. Furthermore, the fiber band with the conventional winding methods is wound onto the liner at a particular tensile force. Due to the deviation of a portion of the fibers from the geodesic path in the deflections at the polar caps, the fiber tension is influenced such that the tension of the fibers on the inside of the curve is reduced. Depending on the geometry of the polar cap and the fiber tension selected, the fiber tension of the fibers on the inside of the curve in this case may be completely lost. These adverse effects may be observed in particular with steep helical plies, i.e. at the region of transition from the polar cap to the cylindrical middle part of the pressure vessel.

It would therefore be desirable to have available a pressure vessel in which the polar caps can be reinforced effectively with fiber composite material, with the fibers over the polar cap nevertheless remaining reliably in their wound position and also a fiber tension which is as uniform as possible being maintained over the entire cross-section of the fiber band.

SUMMARY OF THE INVENTION

An object of the present invention is to make available a pressure vessel in which the polar caps are reinforced effectively with fiber composite material and the fibers over the polar cap, in particular also at the region of transition from the polar cap to the cylindrical middle part of the pressure vessel, nevertheless reliably remain in their wound position and also a fiber tension which is as uniform as possible is maintained over the entire cross-section of the fiber band.

This object is achieved by a fiber-reinforced pressure vessel comprising an inner vessel with a rotationally symmetrical middle part, preferably a cylindrical middle part, with an axis of symmetry, preferably a cylinder axis, along the middle part and two dome-shaped polar caps which close off the middle part, and an outer layer, wound on the inner vessel to reinforce it, made of fiber composite material made of a plurality of plies of fibers embedded in a matrix material which are arranged one above another, which run as a fiber band made of a number of fibers with a location-dependent and position-dependent fiber orientation across the inner vessel, wherein the fiber band at least in some of the plies enters from the middle part at a respective entry fiber angle relative to the axis of symmetry into the region of the dome-shaped polar caps and is guided there at a respective point of reversal in its winding direction back in the direction of the middle part, and has at least one twist in the region of the polar caps.

The rotationally symmetrical middle part here refers to a middle part which is projected on itself when rotated about its axis of symmetry through certain angles. The rotationally symmetrical middle part has for example a circular, elliptical or differently regularly shaped cross-sectional form perpendicular to the axis of symmetry. In the case of cylindrical middle parts, the axis of symmetry is the cylinder axis of the middle part.

The term "dome-shaped polar cap" in this case refers to a polar cap of three-dimensional form having a maximum elevation in the middle of the dome-shaped polar cap over a base surface defined by the lower edge of the polar caps, the base surface corresponding to the cross-sectional area of the middle part perpendicularly to the axis of symmetry. For example in the case of cylindrical middle parts the base surface of the polar cap is a circle. Depending on the cross-sectional area of the middle part, the associated polar caps may have different base surfaces. The dome-like polar caps may also for example have a form which deviates from a hemisphere, which in the cover edge region adjoining the middle part of the inner vessel has a greater curvature compared with a hemispherical surface, whereas the central region of the polar cap has a lesser curvature compared with a hemispherical surface. With this dome-like polar cap, the sudden change in load and rigidity and the stress ratio caused thereby between a peripheral direction of the middle part and an axial direction in the direction of the polar caps can be absorbed particularly effectively by first fibers arranged axially on the polar cap in the central region. Such a particularly suitable dome-shaped cover surface is also referred to as an isotensoid. An isotensoid here designates a form which, in an outer layer of a fiber composite material wound thereon, produces a constant tension in the fibers at all points of the fiber orientation. An axially oriented fiber here refers to fibers with a fiber orientation having a small fiber angle, for example of less than 60°, preferably less than 20°, to the axis of symmetry of the middle part. Corresponding plies of fiber composite material are referred to as axial plies or helical plies. In contrast to this, fibers in what are called radial plies or peripheral plies have a fiber direction with a fiber angle of between approximately 85° and approximately 90° to the axis of symmetry of the middle part. In order to obtain a desired overall stability of the outer layer both in the middle part and at the polar caps, and both against radial and axially acting forces, the outer layer may in this case comprise one or more helical plies and one or more peripheral plies with identical or different thicknesses. In this case, the peripheral plies are wound substantially in the middle part and optionally, depending on the embodiment of the polar caps, in the edge region of the polar caps, while the helical plies cover the entire pressure vessel including the polar caps and the middle part.

The fiber composite material generally consists of two main components, here of fibers, embedded in a matrix material which produces the strong composite between the fibers. The fiber composite material in this case is wound not as individual fibers, but as a fiber band with a plurality of fibers next to one another, with the fibers lying closely next to one another and in contact with each other. This produces a fiber layer on which the fibers are wound in further fiber plies until the fiber composite material has the desired thickness and a corresponding outer layer with this thickness has been produced. In one embodiment, the outer layer comprises first and further fibers, for example second fibers, in a plurality of fiber layers. Owing to the composite, higher-quality properties are imparted to the fiber composite material, such as for example greater strength than each of the two individual components involved could supply. The reinforcing effect of the fibers in the fiber direction occurs if the elasticity modulus of the fibers in the longitudinal direction is greater than the elasticity modulus of the matrix material, if the elongation at break of the matrix material is greater than the elongation at break of the fibers, and if the breaking strength of the fibers is greater than the breaking strength of the matrix material. All types of fibers, for example glass fibers, carbon fibers, ceramic fibers, steel fibers, natural fibers or synthetic fibers, can be used as fibers. Examples of matrix materials which can be used are thermoset materials, elastomers or thermoplastics. The material properties of the fibers and matrix materials are known to the person skilled in the art, so the person skilled in the art can select a suitable combination of fibers and matrix materials for producing the fiber composite material for the respective application. In such case, individual fiber plies may comprise an individual fiber or a plurality of identical or different fibers in the fiber composite region.

The term "twist" here refers to the winding of the fibers of a fiber band against each other and around each other. In the twisted fiber band, the individual fibers of the fiber band swap places with each other at the point of twisting. An individual twist here refers to the turning of the fiber band through 180 degrees. For example, a fiber on the outside right in the fiber band becomes the fiber on the outside left in the fiber band once twisted through 180 degrees. Correspondingly, the second fiber from the right becomes the second fiber from the left once twisted through 180 degrees, and so on. In the present invention, the fiber band (what is called the roving band) is not laid smoothly around the dome-shaped polar cap, as was hitherto conventional with fiber-reinforced pressure vessels, but according to the invention is laid twisted in itself in the fiber orientation across the polar cap. This firstly, because of the curvature of the polar caps and the deviation from the geodesic winding path which is present there for most of the fibers in the fiber band (in particular for the outer fibers in the fiber band), prevents the fiber band from diverging and being able to slide off and thus the thread tension being partly or entirely lost. Secondly, there is thus the possibility of targeted and locally limited introduction of an accumulation of material into regions of the polar caps which are under particular stress.

The present invention thus makes available a pressure vessel in which the polar caps are reinforced effectively with fiber composite material and at least the fibers of the twisted fiber bands over the polar cap nevertheless reliably remain in their wound position, with a fiber tension which is as uniform as possible being maintained over the entire cross-section of the fiber band. In particular, the advantage is observed in the case of steep helical plies.

In one advantageous embodiment, the outer layer is wound with steep and flat helical plies. The combination of flat and steep helical plies combines the advantages of the respective winding angles with each other, with at least one, a plurality of or all the helical plies being wound with a twist.

In one embodiment, the twist is a twist through precisely 180 degrees. This twist leads to the fibers of the fiber band swapping position, so that the fibers running on the curved surface of the polar caps change from an outer position relative to the midpoint of the polar cap to an inner position and vice versa, so that the run of the fiber orientation of all the fibers is approximately the same. Without twisting, this would not be the case, since then the outer fiber would cover a different path length around the polar cap from the inner fiber of the respective fiber band.

In a further embodiment, the twist is arranged at the point of reversal of the respective fiber band. In this position of the twist, the run of the fiber orientation of all the fibers for example in the case of a twist through 180 degrees is exactly the same, so that all the fibers of the fiber band have the same tension and thus remain particularly reliably in their wound position in the region of the polar caps.

In a further embodiment, the at least one twist of the respective fiber bands of a ply with the same entry fiber angle is/are arranged as an arrangement of twists on a circle about a geometric midpoint of the polar cap, with a diameter of the circle depending inter alia on the respective entry fiber angle. The diameter of this circle is yielded substantially from the sine of the entry fiber angle and the cylinder diameter of the middle part.

In one preferred embodiment, the arrangement of twists of all the twisted fiber bands is arranged on respective circles, associated with the individual plies, which lie concentrically with one another, about the midpoint of the polar caps. In this case, the circles with the respective twists are preferably not arranged directly one above another. This firstly prevents plies of fibrous material wound over the twist, because of excessive local thickening which then results, from losing direct contact with the underlying fiber plies and thus lying thereon without cavities therebetween. Secondly, this arrangement of twists makes it possible to fill a concave surface profile produced over the dome-like polar cap in a targeted manner, and thereby to produce a polar-cap contour which is beneficial for the following plies.

In a further embodiment, the outer layer at least in a central region of the polar caps due to an annular accumulation of material which is locally limited, compared with conventional deposition without twist, has a layer thickness which is greater, preferably more than 50% greater, than that of a fiber composite layer without twisted fiber bands. As a result, an annular peripheral reinforcement of the outer layer is produced precisely in the region of the highest loads on the polar cap.

The invention furthermore relates to a method for producing a fiber-reinforced pressure vessel according to the invention, comprising the steps:
  providing an inner vessel with a rotationally symmetrical, preferably cylindrical, middle part with an axis of symmetry, preferably a cylinder axis, and two dome-shaped polar caps which close off the middle part;
  winding a fiber band made of a number of fibers in a plurality of plies with a location-dependent and position-dependent fiber orientation over the middle part and the polar caps of the inner vessel, comprising:
    entering the fiber band at least in some of the plies from the middle part at a respective entry fiber angle relative to the cylinder axis in the region of the polar caps;
    twisting the fiber band for all the fiber bands of a ply at least of a portion of the plies in the region of the polar caps to produce a twist;
    returning the fiber band at a respective point of reversal in the reverse winding direction back in the direction of the middle part; and
    repeating the preceding winding steps until the outer layer of the pressure vessel made of fiber composite material made of a plurality of plies of fibers embedded in a matrix material which are arranged one above another is completed.

The present invention thus makes available a method for producing the pressure vessel according to the invention in which the polar caps are reinforced effectively with fiber composite material and at least the fibers of the twisted fiber bands over the polar cap nevertheless remain reliably in their wound position.

In one embodiment, here the step of twisting for each of the fiber bands of a ply which is to be twisted in the region of the polar caps is carried out through precisely 180 degrees.

In a further embodiment, here the step of twisting takes place at the point of reversal.

In a further embodiment, here the step of twisting is carried out such that preferably the twists of the plies to be twisted are not arranged directly one above another.

In a further embodiment, here the step of twisting is carried out such that the at least one twists of the respective fiber bands at the same entry fiber angle is/are arranged as an arrangement of twists on a circle about a geometric midpoint of the polar cap, wherein a diameter of the circle depends on the respective entry fiber angle. In one preferred embodiment, the twists of all the twisted fiber bands of the plies to be twisted are arranged on respective circles, which lie concentrically with each other, about the midpoint of the polar caps. In one embodiment, here the middle part is a cylindrical middle part with a cylinder axis as the axis of symmetry.

BRIEF DESCRIPTION OF THE FIGURES

These and other aspects of the present invention are shown in detail in the figures as follows.

DETAILED DESCRIPTION OF EXAMPLES OF EMBODIMENT

Figure 1:
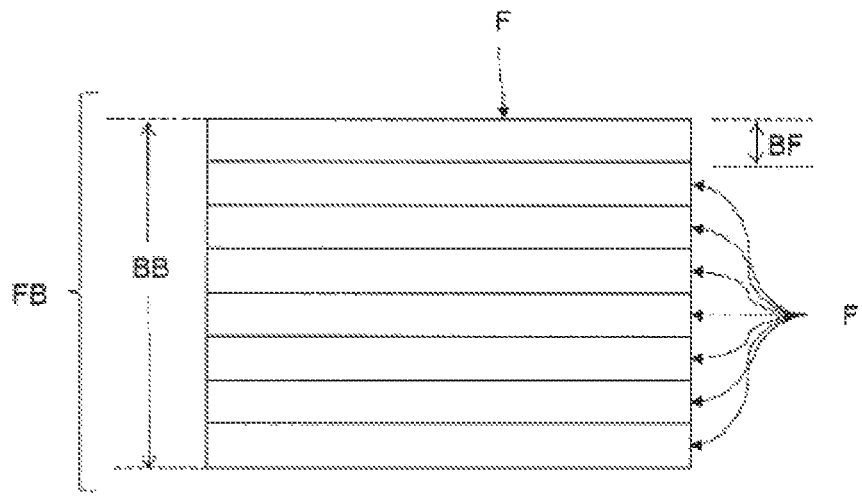
FIG. 1: an embodiment of a fiber band with a plurality of fibers.

FIG. 1 shows an embodiment of a fiber band FB with a plurality of fibers F, here for example with eight fibers F arranged next to one another without gaps, which are each of the same width BF. Such fibers are for example glass fibers, carbon fibers, aramid fibers or basalt fibers. The fiber band FB itself has an overall width BB of 5% and 15%, preferably between 9% and 11%, of the diameter of the middle part.

Figure 2:
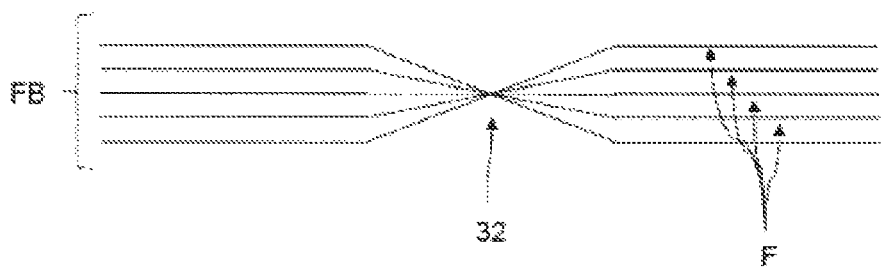
FIG. 2: a schematic representation of a once-twisted fiber band.

FIG. 2 shows a schematic representation of a once-twisted fiber band FB, with the fibers F being illustrated as separate lines for greater clarity. With the fiber bands FB actually used, there should be no spaces between the fibers F. With the fiber band FB twisted once through 180 degrees here, the individual fibers F of the fiber band FB swap places with each other at the point of the twist 32. An individual twist 32 here designates the turning of the fiber band FB through 180 degrees, as shown here. For example, a fiber F at the top outside in the fiber band FB once twisted through 180 degrees becomes the fiber F at the bottom outside in the fiber band FB. Correspondingly, the second fiber F from the top becomes the second fiber F from the bottom once twisted through 180 degrees, and so on.

Figure 3:
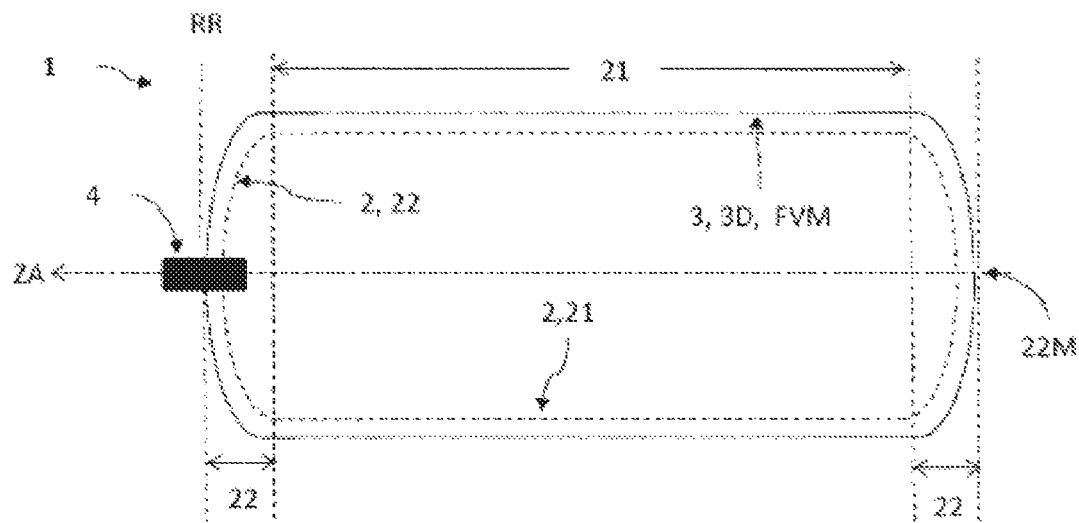
FIG. 3: a pressure vessel according to the invention in the embodiment of a pressure vessel in lateral section.

FIG. 3 shows the pressure vessel according to the invention in lateral section, comprising an inner vessel 2 with a cylindrical middle part 21 with the cylinder axis ZA as the axis of symmetry along the middle part 21 and two dome-shaped polar caps 22 which close off the middle part 21 at both ends. In this case, the one polar cap is equipped with a valve 4 for letting gas into and out of the pressure vessel 1. On the inner vessel 2 there is wound to reinforce it an outer layer 3 made of fiber composite material FVM made of a plurality of plies of fibers F embedded in a matrix material which are arranged one above another, which plies run as a fiber band FB (see FIGS. 1 and 2) made of a number of fibers F with a location-dependent and position-dependent fiber orientation over the inner vessel 2, wherein the fiber band FB at least in some of the plies enters from the middle part 21 at a respective entry fiber angle FW relative to the cylinder axis ZA into the region of the dome-shaped polar caps 22 and there is guided at a respective point of reversal 31 in its winding direction WR back in the direction of the middle part 22, with at least a portion of the fiber bands FB in the region of the polar caps 22 having at least one twist 32. In order to obtain a desired overall stability of the outer layer 3 both in the middle part 21 and at the polar caps 22, and both against radial and against axially acting forces, the outer layer 3 here comprises both a plurality of helical plies which cover the entire pressure vessel 1 including the polar caps 22 and the middle part 21, and a plurality of peripheral plies with identical or different thicknesses, the peripheral plies being wound substantially in the middle part 21 and optionally depending on the embodiment of the polar caps 22 in the edge region 22r of the polar caps 22. The helical plies here comprise axially oriented fibers F with a fiber orientation with a small fiber angle FW for example of less than 60 degrees, preferably less than 20 degrees, to the cylinder axis ZA. In contrast to this, fibers F in the peripheral plies have a fiber direction with a fiber angle FW for example of greater than 80 degrees to the cylinder axis.

Figure 4:
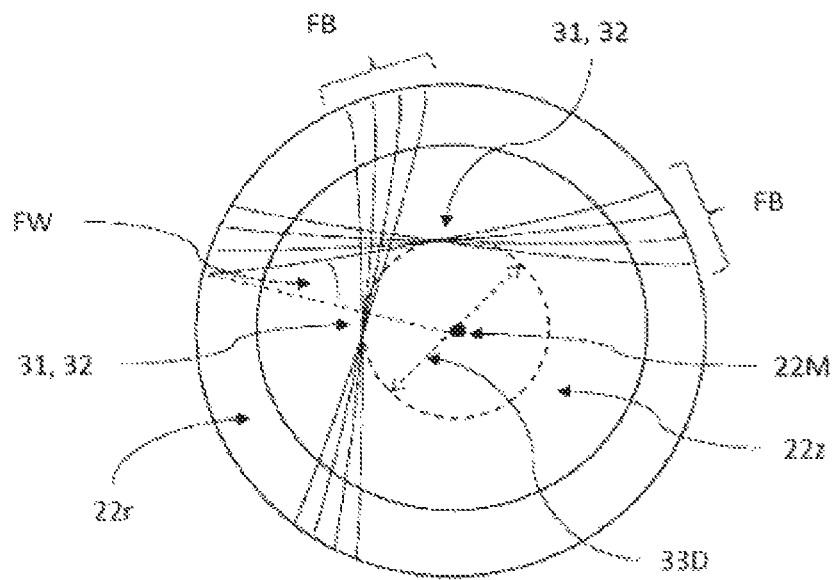
FIG. 4: a schematic representation of the fiber orientation in the region of the polar cap in a top view of the polar cap.

FIG. 4 shows a schematic representation of the fiber orientation in the region of a circular dome-shaped polar cap 22 in a top view of the polar cap 22. The corresponding cylindrical middle part is not shown here, see on this point FIG. 3. In this embodiment, all the fiber bands FB in the region of the polar caps 22 have a twist 32, which for reasons of clarity is illustrated schematically by two fiber bands FB. The twist 32 shown here is a twist through precisely 180 degrees, with the twists 32 illustrated being arranged at the point of reversal 31 of the respective fiber band FB. Additionally, twists 32 of the fiber bands FB (here the two fiber bands FB have the same entry fiber angle FW at the transition from the middle part 21 to the polar cap 22) are arranged as an arrangement of twists on a circle 33 about a geometric midpoint 22M of the polar cap 22, with a diameter 33D of the circle 33 depending inter alia on the respective entry fiber angle FW. In this embodiment, additionally the twists 32 of the further fiber bands FB for other entry fiber angles FB would lie on respective concentrically with each other and to the illustrated circle 33 about the midpoint 22M of the polar caps 22, which is not shown here for reasons of clarity. Due to the twists 32, the outer layer 3 at least in a central region 22z of the polar caps 22 due to an accumulation of material has a layer thickness 3D which is greater, preferably more than 50% greater, than that of a fiber composite layer FVM without twisted fiber bands FB.

Figure 5:
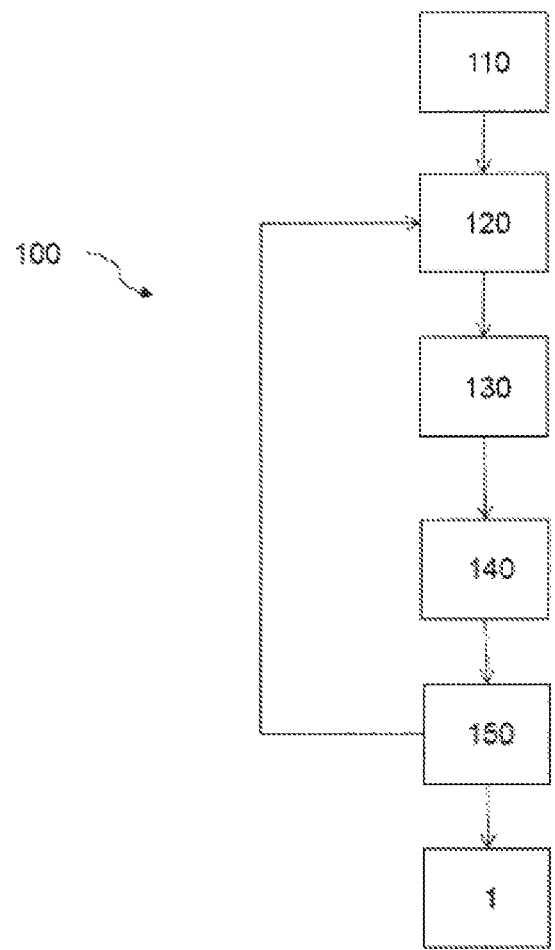
FIG. 5: an embodiment of the method according to the invention

FIG. 5 shows an embodiment of the method according to the invention 100 for producing a fiber-reinforced pressure vessel 1 according to the invention comprising the steps of providing 110 an inner vessel 2 with a rotationally symmetrical, preferably cylindrical, middle part 21 with an axis of symmetry ZA, preferably a cylinder axis, and two dome-shaped polar caps 22 which close off the middle part 21; winding 120 a fiber band FB made of a number of fibers F in a plurality of plies with a location-dependent and position-dependent fiber orientation over the middle part 21 and the polar caps of the inner vessel 2, comprising the following individual steps of the winding process of entering 130 the fiber band FB at least in some of the plies from the middle part 21 at a respective entry fiber angle FW relative to the cylinder axis ZA in the region of the polar caps 22; twisting 140 the fiber band FB at least for a portion of the fiber bands FB in the region [of the] polar caps 22 to produce a twist 32; returning 150 the fiber band at a respective point of reversal 31 in the reverse winding direction WR back in the direction of the middle part 22; and repeating the preceding winding steps 120, 130, 140, 150 until the outer layer 3 of the pressure vessel 1 made of fiber composite material FVM made of a plurality of plies of fibers F embedded in a matrix material which are arranged one above another is completed. In this case, the step of twisting 140 can be carried out for each of the fiber bands FB in the region of the polar caps 22 through precisely 180 degrees. In this case, the step of twisting 140 can take place at the point of reversal 31. The step of twisting 140 can be carried out such that the at least one twist 32 of the respective fiber bands FB at the same entry fiber angle FW is/are arranged as an arrangement of twists on a circle 33 about a geometric midpoint 22M of the polar cap 22, wherein a diameter 330 of the circle 33 depends inter alia on the respective entry fiber angle FW, preferably the twists 32 of all the twisted fiber bands FB are arranged on respective circles 33, which lie concentrically with each other, about the midpoint 22M of the polar caps 22. In this case, the circles with the twists preferably do not lie above one another. This firstly prevents plies of fibrous material wound over the twist, because of excessive local thickening which then results, from losing direct contact with the underlying fiber plies and thus lying thereon without cavities therebetween. Secondly, this arrangement of the twists makes it possible to fill in a concave surface profile produced over the dome-like polar cap in a targeted manner, and thereby to produce a polar-cap contour which is beneficial for the following plies.

LIST OF REFERENCE NUMERALS 1 pressure vessel according to the invention, for example a pressure vessel
2 inner vessel
21 rotationally symmetrical middle part of the inner vessel, for example a cylindrical middle part
22 dome-shaped polar caps on the middle part
22M geometric midpoint of the dome-shaped polar cap
22z central region of the dome-shaped polar cap
22r edge region of the dome-shaped polar cap
3 outer layer made of fiber composite material
3D layer thickness of the outer layer
31 point of reversal of the respective fibers in the wound fiber orientation
32 twisting of the fibers in the polar-cap reinforcing layer
33 circle of twists
33D diameter of the circle of twists
4 valve 100 method for producing the pressure vessel according to the invention
110 providing an inner vessel of the pressure vessel
120 winding the fiber band onto the inner vessel
130 entry of the fiber band from the middle part into the region of the polar caps
140 twisting of at least a portion of the fiber bands in the polar cap region
150 repeating the preceding winding steps
BB width of the fiber band
BF width of the respective fibers in the fiber band
F fibers of the fiber composite material
FB fiber band made of a number of fibers
FVM fiber composite material
FW fiber angle between the respective fiber direction and the cylinder axis, for example the entry fiber angle upon entry of the fiber band from the middle part onto the polar cap
ZA axis of symmetry, for example cylinder axis

The invention claimed is:

1. A fiber-reinforced pressure vessel comprising:
an inner vessel with a rotationally symmetrical, cylindrical middle part having a cylinder axis of symmetry along the middle part and two dome-shaped polar caps which close off the middle part, and
an outer layer wound on the inner vessel to reinforce the inner vessel, the outer layer made of a fiber composite material made of a plurality of plies of fibers embedded in a matrix material which are arranged one above another, which run as fiber bands made of a number of fibers with a location-dependent and layer-dependent fiber orientation across the inner vessel,
wherein at least in some of the plies of fiber of the fiber bands enters from the middle part at an entry fiber angle relative to the cylinder axis of symmetry into a region of the dome-shaped polar caps and at a point of reversal of the plies of fiber of the fiber bands winding direction winds back in the direction of the middle part, the fiber bands having at least one twist in the region of the polar caps.

2. The pressure vessel according to claim 1, wherein the outer layer is wound with steep and flat helical plies.

3. The pressure vessel according to claim 1, wherein the fiber bands have at least one twist in the region of the polar caps.

4. The pressure vessel according to claim 1, wherein the twist is a twist through precisely 180 degrees.

5. The pressure vessel according to claim 1, wherein the twist is arranged at the point of reversal of thea respective fiber band.

6. The pressure vessel according to claim 1, wherein the fiber bands have a width of between 5% and 15% of the diameter of the middle part.

7. The pressure vessel according claim 1, wherein the at least one twist of the respective fiber bands as a ply with the same entry fiber angle is/are arranged as an arrangement of twists on a circle about a geometric midpoint of the polar cap, with a diameter of the circle depending on the respective entry fiber angle.

8. The pressure vessel according to claim 7, wherein the arrangement of twists of all the twisted fiber bands is arranged on respective circles which lie concentrically with one another about the midpoint of the polar caps.

9. The pressure vessel according to claim 8, wherein the circles with the arrangements of twists are not arranged directly one above another.

10. The pressure vessel according to claim 1, wherein the outer layer at least in a central region of the polar caps due to an accumulation of material by means of the arrangement of twists has a layer thickness which is more than 50% greater than that of a fiber composite layer without twisted fiber bands.

11. A method for producing a fiber-reinforced pressure vessel comprising:
providing an inner vessel with a rotationally symmetrical, cylindrical, middle part having a cylinder axis of symmetry, and two dome-shaped polar caps which close off the middle part;
winding a fiber band made of a number of fibers in a plurality of plies with a location-dependent and layer-dependent fiber orientation over the middle part and the polar caps of the inner vessel, the winding comprising:
entering the fiber band at least in some of the plurality of plies from the middle part at a respective entry fiber angle relative to the cylinder axis of symmetry in a region of the polar caps;
twisting the fiber band of a ply at least in a portion of the plurality of plies in the region of the polar caps to produce a twist;
returning the fiber band at a respective point of reversal in the reverse winding direction back in thea direction of the middle part; and
repeating the winding until an outer layer of the pressure vessel made of a fiber composite material made of the plurality of plies of fibers embedded in a matrix material which are arranged one above another is completed.

12. The method according to claim 11, wherein twisting for each of the fiber band of a ply which is to be twisted in the region of the polar caps is carried out through precisely 180 degrees.

13. The method according to claim 11, wherein twisting the fiber band of a ply takes place at the point of reversal.

14. The method according to claim 11, wherein twisting the fiber band of a ply is carried out such that the at least one twist of the fiber band at the same entry fiber angle is/are arranged as an arrangement of twists on a circle about a geometric midpoint of the polar cap, wherein a diameter of the circle depends on the respective entry fiber angle, wherein a twist of a plurality of fiber bands of the plurality of plies to be twisted are arranged on respective circles, which lie concentrically with each other, about the midpoint of the polar caps.

* * * * *